US009635136B2

(12) United States Patent
Levanon et al.

(10) Patent No.: US 9,635,136 B2
(45) Date of Patent: *Apr. 25, 2017

(54) OPTIMIZED IMAGE DELIVERY OVER LIMITED BANDWIDTH COMMUNICATION CHANNELS

(71) Applicant: Bradium Technologies LLC, Suffern, NY (US)

(72) Inventors: Isaac Levanon, Raanana (IL); Yonatan Lavi, Raanana (IL)

(73) Assignee: BRADIUM TECHNOLOGIES LLC, Suffern, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/343,052

(22) Filed: Nov. 3, 2016

(65) Prior Publication Data
US 2017/0054830 A1    Feb. 23, 2017

Related U.S. Application Data

(63) Continuation of application No. 15/281,037, filed on Sep. 29, 2016, which is a continuation of application
(Continued)

(51) Int. Cl.
*G06F 15/16* (2006.01)
*H04L 29/08* (2006.01)
(Continued)

(52) U.S. Cl.
CPC .............. *H04L 67/327* (2013.01); *G06F 3/14* (2013.01); *G06T 3/4092* (2013.01); *G09G 5/003* (2013.01);
(Continued)

(58) Field of Classification Search
CPC .... H04N 1/40068; H04N 1/4172; H04N 1/64; H04N 21/234345; H04N 21/234363;
(Continued)

(56) References Cited

U.S. PATENT DOCUMENTS 4,682,869 A * 7/1987 Itoh ......................... G06T 9/004
358/426.12
4,972,319 A * 11/1990 Delorme ............... G09B 29/007
340/990
(Continued)

OTHER PUBLICATIONS

Declaration of Yonatan Lavi, Exhibit 1017 with exhibits A-E filed in PTAB Case No. IPR2016-00448, all pages.

*Primary Examiner* — David Lazaro
(74) *Attorney, Agent, or Firm* — Anatoly S. Weiser, Esq.; Techlaw LLP.

(57) ABSTRACT

Large-scale images are retrieved over network communications channels for display on a client device by selecting an update image parcel relative to an operator controlled image viewpoint to display via the client device. A request is prepared for the update image parcel and associated with a request queue for subsequent issuance over a communications channel. The update image parcel is received from the communications channel and displayed as a discrete portion of the predetermined image. The update image parcel optimally has a fixed pixel array size, is received in a single and or plurality of network data packets, and were the fixed pixel array may be constrained to a resolution less than or equal to the resolution of the client device display.

27 Claims, 5 Drawing Sheets

Related U.S. Application Data

No. 14/970,526, filed on Dec. 15, 2015, which is a continuation of application No. 14/547,148, filed on Nov. 19, 2014, now Pat. No. 9,253,239, which is a continuation of application No. 13/027,929, filed on Feb. 15, 2011, now Pat. No. 8,924,506, which is a continuation-in-part of application No. 12/619,643, filed on Nov. 16, 2009, now Pat. No. 7,908,343, which is a continuation of application No. 10/035,987, filed on Dec. 24, 2001, now Pat. No. 7,644,131.

(60) Provisional application No. 60/258,465, filed on Dec. 27, 2000, provisional application No. 60/258,466, filed on Dec. 27, 2000, provisional application No. 60/258,467, filed on Dec. 27, 2000, provisional application No. 60/258,468, filed on Dec. 27, 2000, provisional application No. 60/258,488, filed on Dec. 27, 2000, provisional application No. 60/258,489, filed on Dec. 27, 2000.

(51) Int. Cl.
*G06T 3/40* (2006.01)
*G06F 3/14* (2006.01)
*G09G 5/00* (2006.01)
*G06T 11/60* (2006.01)
*G06T 15/04* (2011.01)
*G06F 17/24* (2006.01)
*G06T 19/00* (2011.01)

(52) U.S. Cl.
CPC ........... *G06F 17/241* (2013.01); *G06T 11/60* (2013.01); *G06T 15/04* (2013.01); *G06T 19/003* (2013.01); *G06T 2207/10032* (2013.01); *G09G 2350/00* (2013.01); *G09G 2370/02* (2013.01); *G09G 2370/16* (2013.01)

(58) Field of Classification Search
CPC ........ H04N 21/25825; G06F 17/30241; G06F 3/04815; G06T 3/4092; G06T 19/003
USPC ............... 709/202, 203, 217, 218, 230, 231; 382/305, 232; 345/428, 581, 625
See application file for complete search history.

(56) References Cited

U.S. PATENT DOCUMENTS

| | | | | |
|---|---|---|---|---|
| 5,559,936 | A * | 9/1996 | Poulter | G06F 17/30017 345/428 |
| 5,613,051 | A * | 3/1997 | Iodice | G06F 3/14 345/428 |
| 5,929,860 | A * | 7/1999 | Hoppe | G06T 9/001 345/419 |
| 5,995,903 | A * | 11/1999 | Smith | G01C 21/00 340/995.26 |
| 6,167,442 | A * | 12/2000 | Sutherland | G06F 17/3028 709/217 |
| 6,212,301 | B1 * | 4/2001 | Warner | G06T 9/00 382/232 |
| 6,246,797 | B1 * | 6/2001 | Castor | H04N 19/63 375/E7.035 |
| 6,285,317 | B1 * | 9/2001 | Ong | G01C 21/3647 340/995.2 |
| 6,314,452 | B1 * | 11/2001 | Dekel | H04N 19/647 375/E7.045 |
| 6,326,965 | B1 * | 12/2001 | Castelli | G06F 17/30241 345/420 |
| 6,345,279 | B1 * | 2/2002 | Li | G06F 17/30905 |
| 6,346,938 | B1 * | 2/2002 | Chan | G06F 3/04815 345/419 |
| 6,397,259 | B1 * | 5/2002 | Lincke | G06F 17/3089 707/E17.116 |
| 6,449,639 | B1 * | 9/2002 | Blumberg | G06F 17/30905 707/E17.118 |
| 6,496,189 | B1 * | 12/2002 | Yaron | G06T 15/40 345/419 |
| 6,525,732 | B1 * | 2/2003 | Gadh | G06T 15/20 345/428 |
| 6,608,628 | B1 * | 8/2003 | Ross | G06T 17/20 345/619 |
| 6,608,933 | B1 * | 8/2003 | Dowell | G06T 9/007 382/232 |
| 6,625,309 | B1 * | 9/2003 | Li | G06T 15/40 345/418 |
| 6,704,024 | B2 * | 3/2004 | Robotham | G06F 3/14 345/581 |
| 6,704,791 | B1 * | 3/2004 | Harris | G06T 15/20 709/231 |
| 6,711,297 | B1 * | 3/2004 | Chang | G06T 1/00 375/E7.065 |
| 6,754,365 | B1 * | 6/2004 | Wen | G06T 1/0078 382/100 |
| 6,801,665 | B1 * | 10/2004 | Atsumi | H04N 19/70 375/E7.056 |
| 6,882,755 | B2 * | 4/2005 | Silverstein | H04N 21/2662 375/E7.011 |
| 6,898,311 | B2 * | 5/2005 | Whitehead | H04N 1/64 375/E7.184 |
| 6,970,604 | B1 * | 11/2005 | Chai | H04N 19/176 375/E7.056 |
| 7,644,131 | B2 * | 1/2010 | Levanon | G06F 3/14 345/625 |
| 8,924,506 | B2 * | 12/2014 | Levanon | G06F 3/1454 345/625 |

* cited by examiner

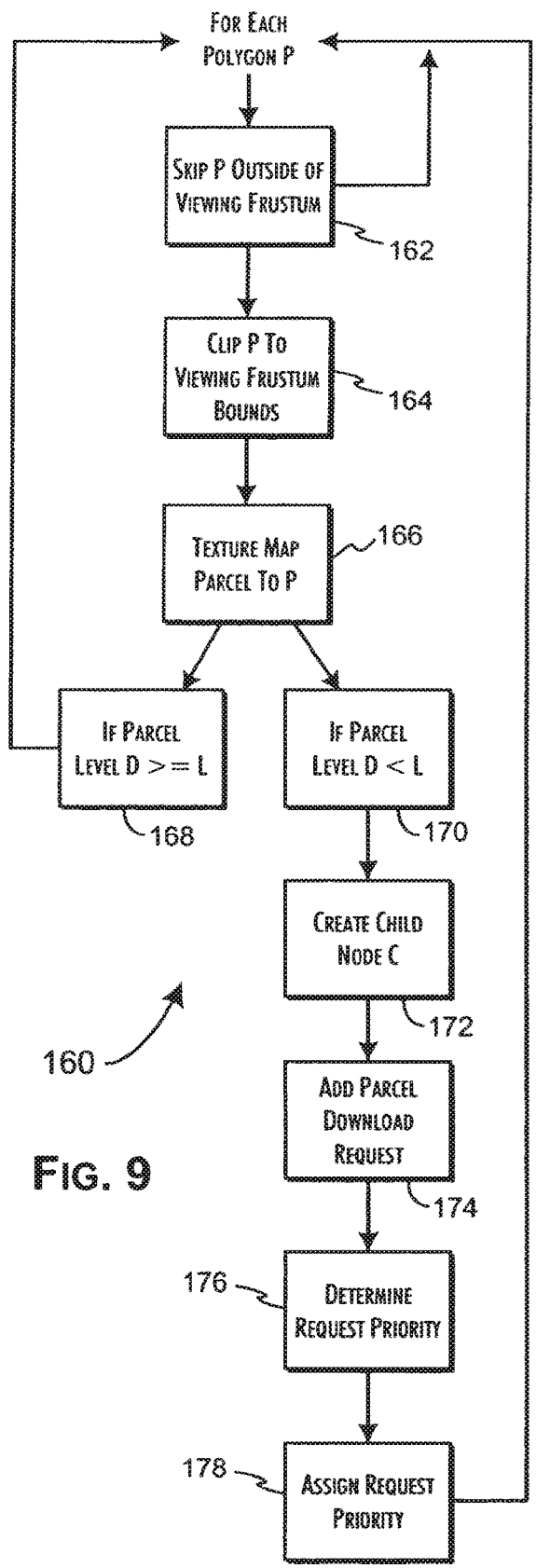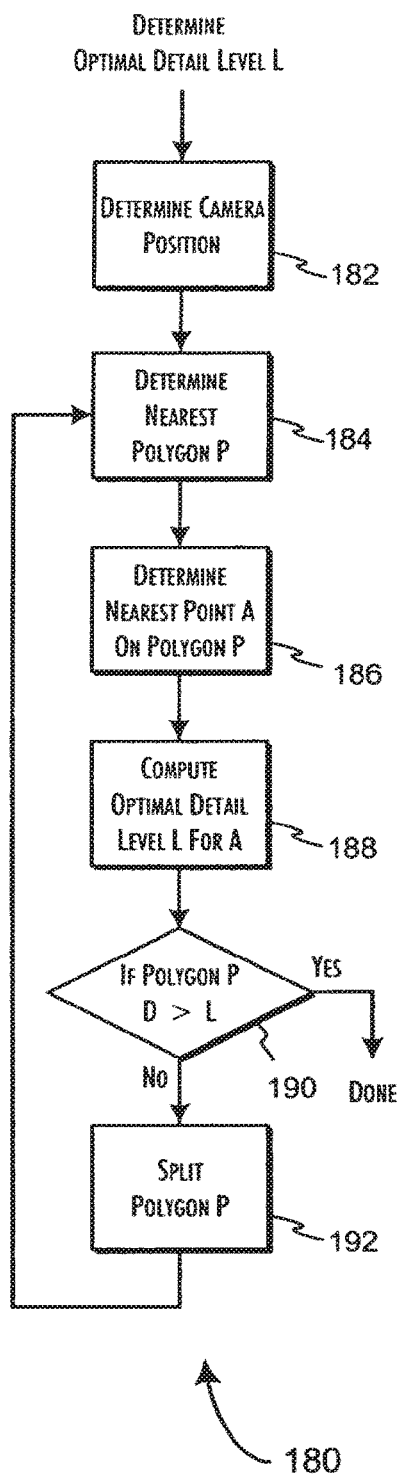
FIG. 9
FIG. 10

OPTIMIZED IMAGE DELIVERY OVER LIMITED BANDWIDTH COMMUNICATION CHANNELS

PRIORITY CLAIMS/RELATED APPLICATIONS

This application is a continuation of and claims priority to U.S. patent application Ser. No. 14/970,526, filed Dec. 15, 2015, entitled OPTIMIZED IMAGE DELIVERY OVER LIMITED BANDWIDTH COMMUNICATION CHANNELS; this application is also a continuation of and claims priority to U.S. patent application Ser. No. 15/281,037, filed Sep. 29, 2016, entitled OPTIMIZED IMAGE DELIVERY OVER LIMITED BANDWIDTH COMMUNICATION CHANNELS; each of the U.S. patent application Ser. No. 14/970,526 and Ser. No. 15/281,037 is a continuation of and claims priority to U.S. patent application Ser. No. 14/547,148, filed Nov. 19, 2014, entitled OPTIMIZED IMAGE DELIVERY OVER LIMITED BANDWIDTH COMMUNICATION CHANNELS, now U.S. Pat. No. 9,253,239; which is a continuation of and claims priority to U.S. patent application Ser. No. 13/027,929, filed Feb. 15, 2011, entitled OPTIMIZED IMAGE DELIVERY OVER LIMITED BANDWIDTH COMMUNICATION CHANNELS, now U.S. Pat. No. 8,924,506; which is a continuation-in-part of and claims priority to U.S. patent application Ser. No. 12/619,643, filed on Nov. 16, 2009, entitled OPTIMIZED IMAGE DELIVERY OVER LIMITED BANDWIDTH COMMUNICATION CHANNELS, now U.S. Pat. No. 7,908,343; which is a continuation of and claims priority to U.S. patent application Ser. No. 10/035,987, filed on Dec. 24, 2001, entitled OPTIMIZED IMAGE DELIVERY OVER LIMITED BANDWIDTH COMMUNICATION CHANNELS, now U.S. Pat. No. 7,644,131; which claims the benefit under 35 U.S.C. §119(e) of U.S. Provisional Application Nos. 60/258,488, 60/258,489, 60/258,465, 60/258,468, 60/258,466, and 60/258,467, all filed Dec. 27, 2000. The disclosures of all the foregoing patent documents are incorporated herein by reference as if fully set forth herein, including Figures, Claims, and Tables. The present application is also related to application Ser. No. 10/035,981, entitled SYSTEM AND METHODS FOR NETWORK IMAGE DELIVERY WITH DYNAMIC VIEWING FRUSTUM OPTIMIZED FOR LIMITED BANDWIDTH COMMUNICATION CHANNELS, Levanon et al., filed on Dec. 24, 2001, now U.S. Pat. No. 7,139,794, issued on Nov. 21, 2006, which is assigned to the Assignee of the present application.

FIELD

The disclosure is related to network based, image distribution systems and, in particular, to a system and methods for efficiently selecting and distributing image parcels through a narrowband or otherwise limited bandwidth communications channel to support presentation of high-resolution images subject to dynamic viewing frustums.

BACKGROUND

The Internet and or other network systems may provide a unique opportunity to transmit for example complex images, typically large scale bit-maps, particularly those approaching photo-realistic levels, over large area and or distances. In common application, the images may be geographic, topographic, and or other highly detailed maps. The data storage requirements and often proprietary nature of such images could be such that conventional interests may be to transfer the images on an as-needed basis.

In conventional fixed-site applications, the image data may be transferred over a relatively high-bandwidth network to client computer systems that in turn, may render the image. Client systems may typically implement a local image navigation system to provide zoom and or pan functions based on user interaction. As well recognized problem with such conventional systems could be that full resolution image presentation may be subject to the inherent transfer latency of the network. Different conventional systems have been proposed to reduce the latency affect by transmitting the image in highly compressed formats that support progressive resolution build-up of the image within the current client field of view. Using a transform compressed image transfer function increases the field of the image that can be transferred over a fixed bandwidth network in unit time. Progressive image resolution transmission, typically using a differential resolution method, permits an approximate image to be quickly presented with image details being continuously added over time.

Tzou, in U.S. Pat. No. 4,698,689, describes a two-dimensional data transform system that supports transmission of differential coefficients to represent an image. Subsequent transmitted coefficient sets are progressively accumulated with prior transmitted sets to provide a succeedingly refined image. The inverse-transform function performed by the client computer is, however, highly compute intensive. In order to simplify the transform implementation and further reduce the latency of presenting any portion of an approximate image, images are subdivided into a regular array. This enables the inverse-transform function on the client, which is time-critical, to deal with substantially smaller coefficient data sets. The array size in Tzou is fixed, which leads to progressively larger coefficient data sets as the detail level of the image increases. Consequently, there is an inherently increasing latency in resolving finer levels of detail.

An image visualization system proposed by Yap et al., U.S. Pat. No. 6,182,114, overcomes some of the foregoing problems. The Yap et al. system also employs a progressive encoding transform to compress the image transfer stream. The transform also operates on a subdivided image, but the division is indexed to the encoding level of the transform. The encoded transform coefficient data sets are, therefore, of constant size, which supports a modest improvement in the algorithmic performance of the inverse transform operation required on the client.

Yap et al. adds utilization of client image panning or other image pointing input information to support a foveation-based operator to influence the retrieval order of the subdivided image blocks. This two-dimensional navigation information is used to identify a foveal region that is presumed to be the gaze point of a client system user. The foveation operator defines the corresponding image block as the center point of an ordered retrieval of coefficient sets representing a variable resolution image. The gaze point image block represents the area of highest image resolution, with resolution reduction as a function of distance from the gaze point determined by the foveation operator. This technique thus progressively builds image resolution at the gaze point and succeedingly outward based on a relatively compute intensive function. Shifts in the gaze point can be responded to with relative speed by preferentially retrieving coefficient sets at and near the new foveal region.

Significant problems remain in permitting the convenient and effective use of complex images by many different types of client systems, even with the improvements provided by the various conventional systems. In particular, the implementation of conventional image visualization systems is generally unworkable for smaller, often dedicated or embedded, clients where use of image visualization would clearly be beneficial. Conventional approaches effectively presume that client systems have an excess of computing performance, memory and storage. Small clients, however, typically have restricted performance processors with possibly no dedicated floating-point support, little general purpose memory, and extremely limited persistent storage capabilities, particularly relative to common image sizes. A mobile computing device such as mobile phone, smart phone, tablet and or personal digital assistant (PDA) is a characteristic small client. Embedded, low-cost kiosk, automobile navigation systems and or Internet enabled I connected TV are other typical examples. Such systems are not readily capable, if at all, of performing complex, compute-intensive Fourier or wavelet transforms, particularly within a highly restricted memory address space.

As a consequence of the presumption that the client is a substantial computing system, conventional image visualization systems also presume that the client is supported by a complete operating system. Indeed, many expect and require an extensive set of graphics abstraction layers to be provided by the client system to support the presentation of the delivered image data. In general, these abstraction layers are conventionally considered required to handle the mapping of the image data resolution to the display resolution capabilities of the client system. That is, resolution resolved image data provided to the client is unconstrained by any limitation in the client system to actually display the corresponding image. Consequently, substantial processor performance and memory can be conventionally devoted to handling image data that is not or cannot be displayed.

Another problem is that small clients are generally constrained to generally to very limited network bandwidths, particularly when operating under wireless conditions. Such limited bandwidth conditions may exist due to either the direct technological constraints dictated by the use of a low bandwidth data channel or indirect constraints imposed on relatively high-bandwidth channels by high concurrent user loads. Cellular connected PDAs and webphones are examples of small clients that are frequently constrained by limited bandwidth conditions. The conventionally realizable maximum network transmission bandwidth for such small devices may range from below one kilobit per second to several tens of kilobits per second. While Yap et al. states that the described system can work over low bandwidth lines, little more than utilizing wavelet-based data compression is advanced as permitting effective operation at low communications bandwidths. While reducing the amount of data that must be carried from the server to the client is significant, Yap et al. simply relies on the data packet transfer protocols to provide for an efficient transfer of the compressed image data. Reliable transport protocols, however, merely mask packet losses and the resultant, sometimes extended recovery latencies. When such covered errors occur, however, the aggregate bandwidth of the connection is reduced and the client system can stall waiting for further image data to process.

Consequently, there remains a need for an image visualization system that can support small client systems, place few requirements on the supporting client hardware and software resources, and efficiently utilize low to very low bandwidth network connections.

SUMMARY

Thus, a general purpose of the present invention is to provide an efficient system and methods of optimally presenting image data on client systems with potentially limited processing performance, resources, and communications bandwidth.

This is achieved in the present invention by providing for the retrieval of large-scale images over network communications channels for display on a client device by selecting an update image parcel relative to an operator controlled image viewpoint to display via the client device. A request is prepared for the update image parcel and associated with a request queue for subsequent issuance over a communications channel. The update image parcel is received from the communications channel and displayed as a discrete portion of the predetermined image. The update image parcel optimally has a fixed pixel array size, is received in a single and or plurality of network data packets, and were the fixed pixel array may be constrained to a resolution less than or equal to the resolution of the client device display.

An advantage of the present invention is that both image parcel data requests and the rendering of image data are optimized to address the display based on the display resolution of the client system.

Another advantage of the present invention is that the prioritization of image parcel requests is based on an adaptable parameter that minimizes the computational complexity of determining request prioritization and, in turn, the progressive improvement in display resolution within the field of view presented on a client display.

A further advantage of the present invention is that the client software system requires relatively minimal client processing power and storage capacity. Compute intensive numerical calculations are minimally required and image parcel data is compactly stored in efficient data structures. The client software system is very small and easily downloaded to conventional computer systems or embedded in conventional dedicated function devices, including portable devices, such as PDAs, tablets and webphones.

Still another advantage of the present invention is that image parcel data requests and presentation can be readily optimized to use low to very low bandwidth network connections. The software system of the present invention provides for re-prioritization of image parcel data requests and presentation in circumstances where the rate of point-of-view navigation exceeds the data request rate.

Yet another advantage of the present invention is that image parcel data rendering is performed without requiring any complex underlying hardware or software display subsystem. The client software system of the present invention includes a bit-map rendering engine that draws directly to the video memory of the display, thus placing minimal requirements on any underlying embedded or disk operating system and display drivers. Complex graphics and animation abstraction layers are not required.

Still another advantage of the present invention is that image parcel block compression is used to obtain fixed size transmission data blocks. Image parcel data is recoverable from transmission data using a relatively simple client decompression algorithm. Using fixed size transmission data blocks enables image data parcels to be delivered to the client in bounded time frames.

A yet further advantage of the present invention is that multiple data forms can be transferred to the client software system for concurrent display. Array overlay data, correlated positionally to the image parcel data and generally insensitive to image parcel resolution, can be initially or progressively provided to the client for parsing and parallel presentation on a client display image view.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein:

FIG. 9 provides a process flow diagram detailing the rendering and progressive prioritization of image parcel data download requests in accordance with a preferred embodiment of the present invention; and FIG. 10 provides a process flow diagram detailing the determination of an optimal detail level for image parcel presentation for a current viewing frustum in accordance with a preferred embodiment of the present invention.

DETAILED DESCRIPTION OF ONE OR MORE EMBODIMENTS

Figure 1:
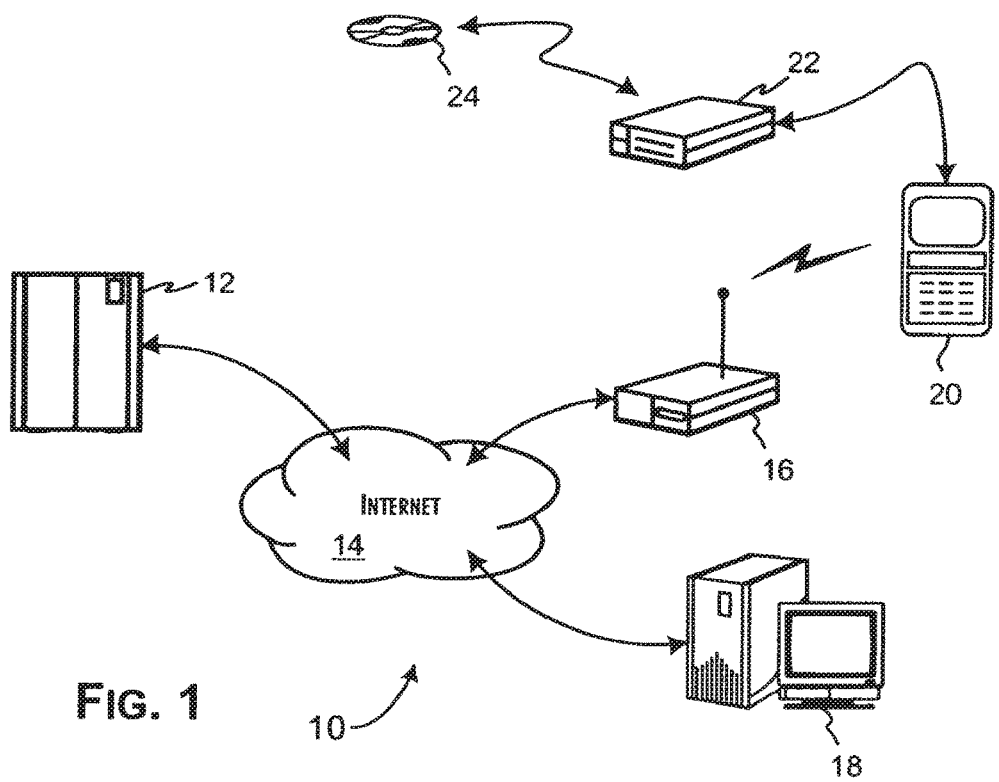
FIG. 1 depicts a preferred system environment within which various embodiments of the present invention can be utilized.

The preferred operational environment 10 of the present invention is generally shown in FIG. 1. A network server system 12, operating as a data store and server of image data, is responsive to requests received through a communications network, such as the Internet 14 generally and various tiers of internet service providers (ISPs) including a wireless connectivity provider 16. Client systems, including conventional workstations and personal computers 18 and smaller, typically dedicated function devices often linked through wireless network connections, such as PDAs, webphones 20, and automobile navigation systems, source image requests to the network server 12, provide a client display and enable image navigational input by a user of the client system. Alternately, a dedicated function client system 20 may be connected through a separate or plug-in local network server 22, preferably implementing a small, embedded Web server, to a fixed or removable storage local image repository 24. Characteristically, the client system 18, 20 displays are operated at some fixed resolution generally dependent on the underlying display hardware of the client systems 18, 20.

The image navigation capability supported by the present invention encompasses a viewing frustum placed within a three-dimensional space over the imaged displayed on the client 18, 20. Client user navigational inputs are supported to control the x, y lateral, rotational and z height positioning of the viewing frustum over the image as well as the camera angle of incidence relative to the plane of the image. To effect these controls, the software implemented on the client systems 18, 20 supports a three-dimensional transform of the image data provided from the server 12, 22.

Figure 2:
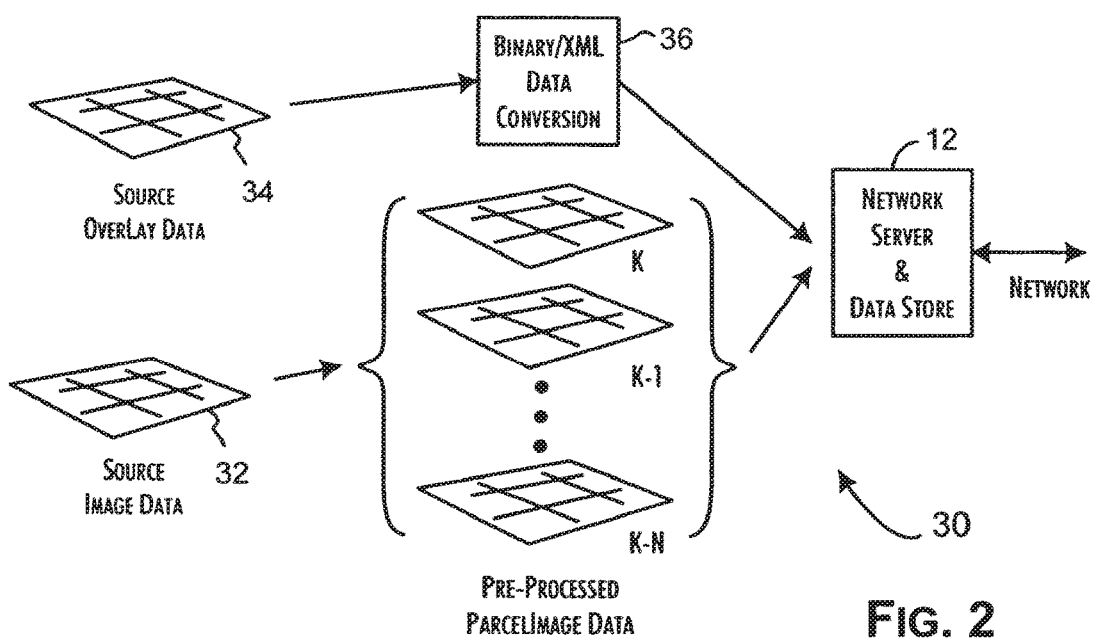
FIG. 2 is a block diagram illustrating the preparation of image parcel and overlay data set that are to be stored by and served from a network server system in accordance with a preferred embodiment of the present invention.

In accordance with the preferred embodiments of the present invention, as generally illustrated in FIG. 2, a network image server system 30 stores a combination of source image data 32 and source overlay data 34. The source image data 32 is typically high-resolution bit-map raster map and or satellite imagery of geographic regions, which can be obtained from commercial suppliers. The overlay image data 34 is typically a discrete data file providing image annotation information at defined coordinates relative to the source image data 32. In the preferred embodiments of the present invention, image annotations include, for example, street, building and landmark names, as well as representative 2 and 3D objects, graphical icons, decals, line segments, and or text and or other characters, graphics and or other media.

The network image server system 30 preferably pre-processes the source image data 32 and or source overlay data 34 to forms preferred for storage and serving by the network server 12, 22. The source image data 32 is preferably pre-processed to obtain a series $K_{1-N}$ of derivative images of progressively lower image resolution. The source image data 32, corresponding to the series image $K_0$, is also subdivided into a regular array such that each resulting image parcel of the array has for example a 64 by 64 pixel resolution where the image data has a color or bit per pixel depth of 16 bits, which represents a data parcel size of 8K bytes. The resolution of the series $K_{1-N}$ of derivative images is preferably related to that of the source image data 32 or predecessor image in the series by a factor of four. The array subdivision is likewise related by a factor of four such that each image parcel is of a fixed 8K byte size.

In the preferred embodiment of the present invention, the image parcels are further compressed and stored by the network server 12, 22. The preferred compression algorithm may implement for example a fixed 4:1 compression ratio such that each compressed and stored image parcel has a fixed 2K byte size. The image parcels are preferably stored in a file of defined configuration such that any image parcel can be located by specification of a $K_D$, X, Y value, representing the image set resolution index D and corresponding image array coordinate.

In other implementations, the image array dimensions (which as 64×64 above) may be powers of two so that the image array can be used in texture mapping efficiently. To accommodate different data parcel size than the 2 KByte associated with 64×64 pixel parcel dimension described above and other communication protocol and overhead requirements, to accommodate transmission through other than a 3 KByte per second transmission channel, the present invention may use larger compression ratios that takes, for example, a 128×128 or 256×256 pixel parcel dimension and compresses it to meet the 3 KByte per second transmission channel, or other communication bandwidth used to stream the parcel.

The system may also accommodate different and larger data parcel sizes as transmission protocols, compression ratio achieved and micro-architectures of the client computers change. For purposes above, the data content was a pixel array representing image data. Where the data parcel content is vector, text or other data that may subject to different client system design factors, other parcel sizes may be used. Furthermore, the parcel sizes can be different between the server and the client. For example the server may create parcels or hold parcels, for streaming with 256×256 pixel parcel dimension and the client my render them as 64×64. In addition, parcels sizes on different servers may vary from one server to another and from the client side rendering. In the system, each grid is treated as a sparse data array that can be progressively revised to increase the resolution of the grid and thereby the level of detail presented by the grid.

The source overlay data 34 is preferably pre-processed 36 into either an open XML format, such as the Geography Markup Language (GML), which is an XML based encoding standard for geographic information developed by the OpenGIS Consortium (OGC; www.opengis.org), or a proprietary binary representation. The XML/GML representation is preferred as permitting easier interchange between different commercial entities, while the binary representation is preferred as more compact and readily transferable to a client system 18, 20. In both cases, the source overlay data 34 is pre-processed to contain the annotation data preferably in a resolution independent form associated with a display coordinate specification relative to the source image data 32. The XML, GML or binary overlay data may be compressed prior to storage on the network server 12, 22.

Figure 3:
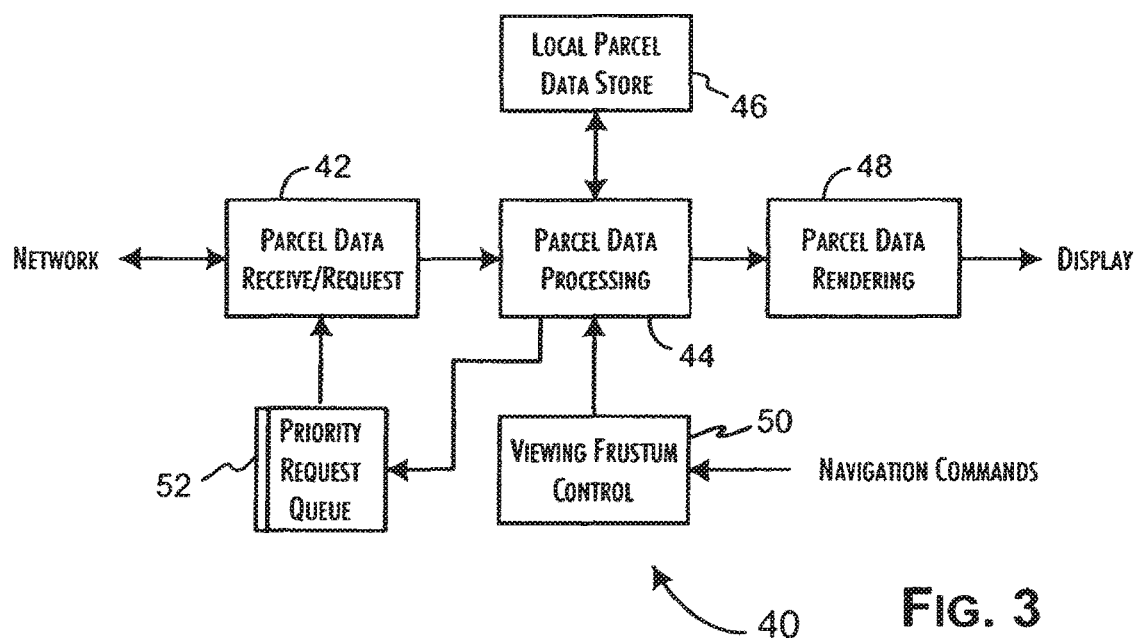
FIG. 3 is a block diagram of a client system image presentation system constructed in accordance with a preferred embodiment of the present invention.

The preferred architecture 40 of a client system 18, 20, for purposes of implementing the present invention, is shown in FIG. 3. The architecture 40 is preferably implemented by software plug-in or application executed by the client system 18, 20 and that utilizes basic software and hardware services provided by the client system 18, 20. A parcel request client 42 preferably implements an HTML client that supports HTML-based interactions with the server 12, 22 using the underlying network protocol stack and hardware network interface provided by the client systems 18, 20. A central parcel processing control block 44 preferably implements the client process and control algorithms. The control block 44 directs the transfer of received image parcels and XML/GML/binary overlay data to a local parcel data store 46. Local parcel data store 46 may also act for example as local cache weather the entire data or part of it is in dynamic and/or static cache. Preferably image data parcels are stored in conventional quad-tree data structures, where tree nodes of depth D correspond to the stored image parcels of a derivative image of resolution KD. The XML/GML/binary overlay data is preferably stored as a data object that can be subsequently read by an XML/GML/binary parser implemented as part of the control block 44.

The control block 44 is also responsible for decompressing and directing the rendering of image parcels to a local display by a rendering engine 48. Preferably, the rendering engine 48 writes to the video memory of the underlying client display hardware relying on only generic graphics acceleration hardware capabilities and may take advantage of more advanced graphics acceleration hardware when available in the client system 18, 20. In general, the relied-on capabilities include bit-bit and related bit-oriented functions that are readily supported by current conventional display controller hardware. The rendering engine 48 is optimized to perform image parcel texture mapping without reliance on complex floating point operations, permitting even relatively simple processors to efficiently execute the rendering engine 48. The rendering engine 48 may take advantage of floating point operations when available in the client system 18, 20.

Changes in the viewing frustum are determined from user input navigation commands by a frustum navigation block 50. In the preferred embodiments of the present invention, the input navigation controls are modeled for three-dimensional fly-over navigation of the displayed image. The navigation controls support point-of-view rotation, translation, attitude, and altitude over the displayed image. The effective change in viewing frustum as determined by the frustum navigation block 50 is provided to the control block 44.

The control block 44, based in part on changes in the viewing frustum, determines the ordered priority of image parcels to be requested from the server 12, 22 to support the progressive rendering of the displayed image. The image parcel requests are placed in a request queue 52 for issuance by the parcel request client 42. Preferably, the pending requests are issued in priority order, thereby dynamically reflecting changes in the viewing frustum with minimum latency.

In various implementations of the parcel processing, each data parcel is independently processable by the client system 18, 20, which is enabled by the selection and server-side processing used to prepare a parcel for transmission, thus providing for on-demand real-time parcel processing and creation on the server side for streaming based on the client request and not only for pre-processed parcel creation for retrieval for streaming from the server. Thus, the system can use both pre-processed parcels on the server and on-demand real-time creation of such parcels on the server side for streaming to the client.

Figure 4:
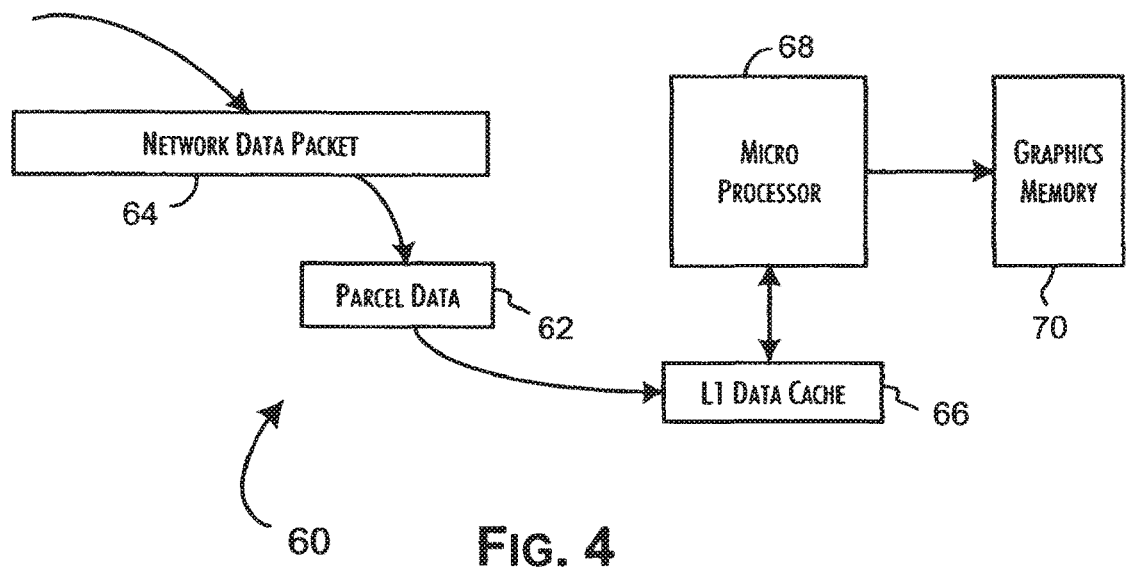
FIG. 4 provides a data block diagram illustrating an optimized client image block processing path constructed in accordance with a preferred embodiment of the present invention.

An optimal image parcel data flow 60, as configured for use in the preferred embodiments of the present invention, is shown in FIG. 4. Preferably, the TCP/IP network protocol is used to deliver image parcels to the clients 18, 20. For the preferred embodiments, where network bandwidth is limited or very limited, entire image parcels are preferably delivered in corresponding data packets. This preference maximizes data delivery while avoiding the substantial latency and processing overhead of managing image parcel data split over multiple network packets. Thus, a 2K byte compressed image parcel 62 is delivered as the data payload of a TCP/IP packet 64. Uncompressed, the 8K byte image parcel 62 is recognized as part of the present invention as being within the nominally smallest L1 data cache 66 size of conventional microprocessors 68. By ensuring that an uncompressed image parcel fits within the L1 cache, the texture map rendering algorithm can execute with minimum memory management overhead, thus optimally utilizing the processing capability of the microprocessor 68. Additionally, the writing of video data as a product of the rendering algorithm is uniform, thereby improving the apparent video stability of the display to the user.

Figure 5:
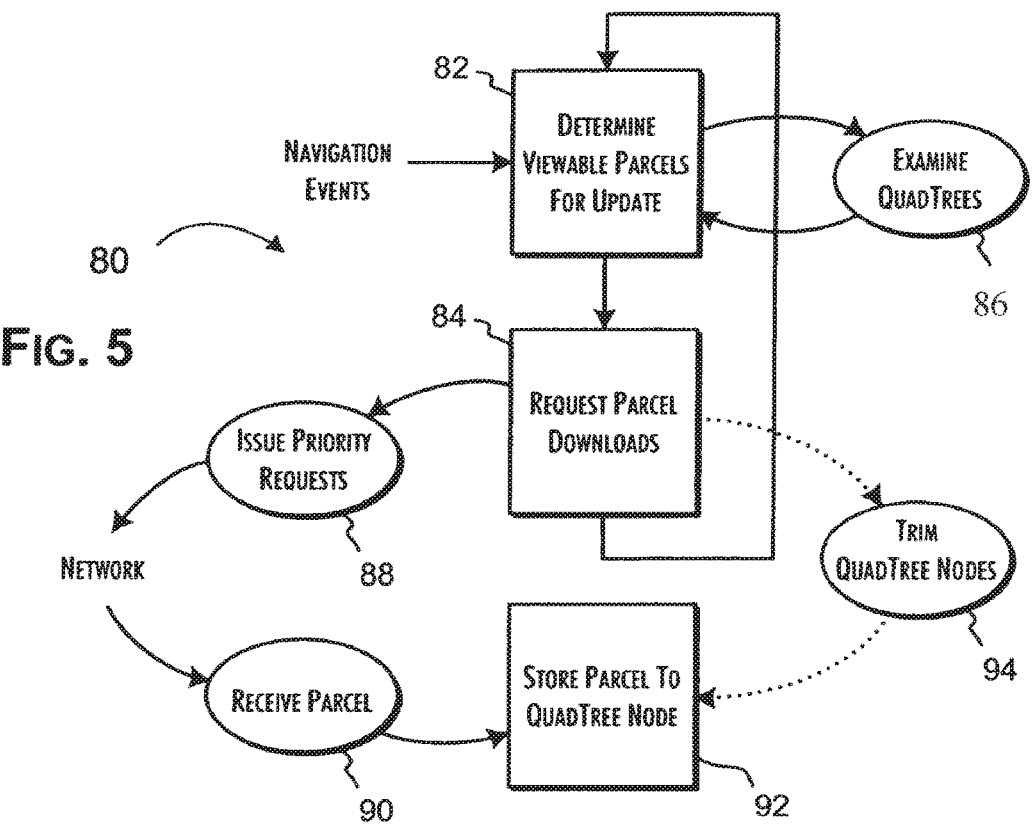
FIG. 5 is a process flow diagram showing a main processing thread implemented in a preferred embodiment of the present invention.

The client architecture 40 preferably executes in multiple process threads, with additional threads being utilized for individual network data request transactions. As shown in FIG. 5, an image parcel management process 80 implements a loop that determines image parcels subject to update 82 and creates corresponding image parcel download requests 84. Navigation events that alter the viewing frustum are considered in part to determine the current field of view. The quad tree data structures are examined 86 to identify viewable image parcels of higher resolution than currently available in the parcel data store 46.

A pool of image request threads is preferably utilized to manage the image parcel download operations. In the preferred embodiments of the present invention, a pool of four network request threads is utilized. The number of pool threads is determined as a balance between the available system resources and the network response latency, given the available bandwidth of the network connection. Empirically, for many wireless devices, four concurrent threads are able to support a relatively continuous delivery of image data parcels to the client 20 for display processing. As image parcels are progressively identified for download, a free request thread is employed to issue 88 a corresponding network request to the server 12, 22. When a network response is received, the corresponding thread recovers 90 the image parcel data. The received image parcel is then stored 92 in a corresponding quad-tree data structure node.

For small clients 20, the available memory for the parcel data store 46 is generally quite restricted. In order to make optimal use of the available memory, only currently viewable image parcels are subject to download. Where the size of the parcel data store 46 is not so restricted, this constraint can be relaxed. In either case, a memory management process 94 runs to monitor use of the parcel data store 46 and selectively remove image parcels to free memory for newly requested image parcels. Preferably, the memory management process 94 operates to preferentially remove image parcels that are the furthest from the current viewing frustum and that have the highest data structure depth. Preferably child node image parcels are always removed before a parent node parcel is removed.

Figure 6:
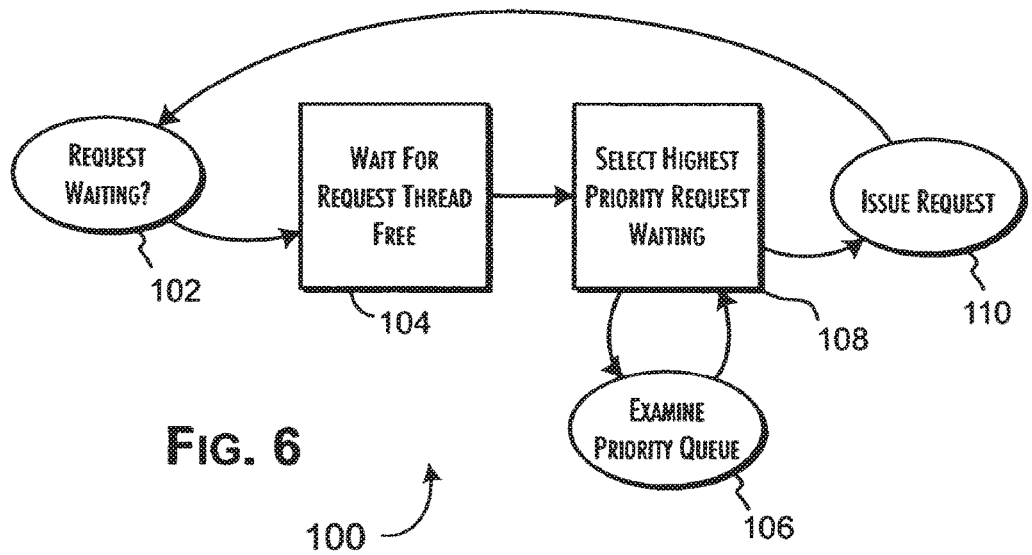
FIG. 6 provides a process flow diagram showing a network request thread implemented in a preferred embodiment of the present invention.

A preferred network request management process 100 is shown in FIG. 6. The process 100 waits 102 on the existence of a download request in the priority request queue 52. The process 100 then waits on a network request pool thread to become free 104. When a network request thread becomes available, the process 100 examines 106 all of the pending requests in the priority request queue 52 and selects 108 the request with the highest assigned priority. Thus, sequentially enqueued requests can be selectively issued out of order based on an independently assigned request priority. The request is then issued 110 and the request management process 100 leaves the request thread waiting on a network response.

Figure 7:
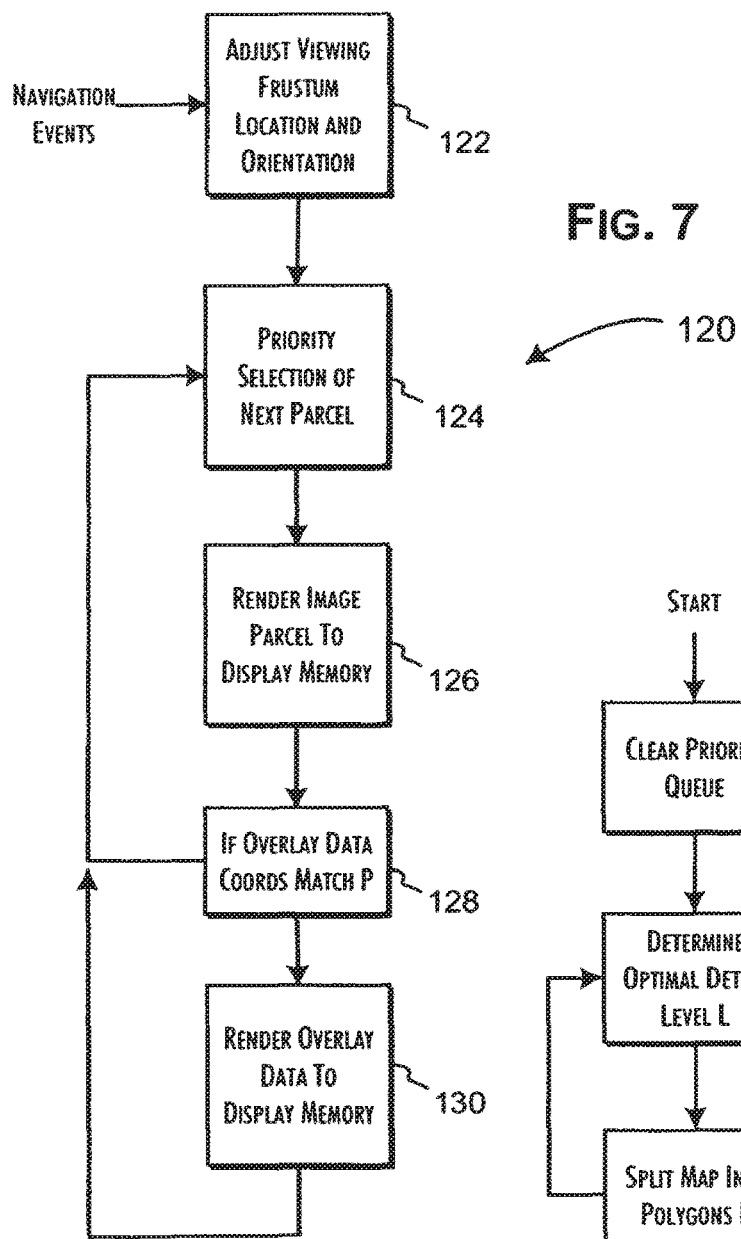
FIG. 7 provides a process flow diagram showing a display image rendering thread implemented in a preferred embodiment of the present invention.

FIG. 7 presents a preferred display management process 120. Event driven user navigation information is evaluated 122 to determine a current viewing frustum location and orientation within a three-dimensional space relative to the displayed image. An algorithmic priority selection 124 of a next image parcel to render is then performed. The selected image parcel is then rendered 126 to the display memory 70. The rendering operation preferably performs a texture map transform of the parcel data corresponding to the current viewing frustum location and orientation. The overlay data is then parsed or is pre-parsed to determine 128 whether the image coordinates of any overlay annotation correspond to the current image parcel location. If the coordinates match, the overlay annotation is rendered 130 to the video display memory 70. The process 120 then continues with the next selection 124 of an image parcel to render, subject to any change in the viewing frustum location and orientation.

Figure 8:
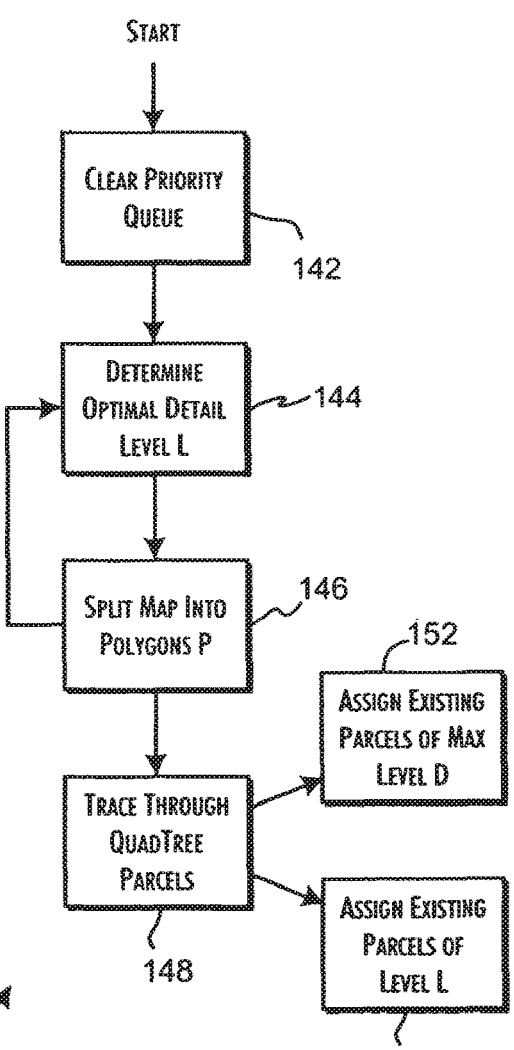
FIG. 8 provides a process flow diagram showing the parcel map processing performed preliminary to the rendering of image data parcels in accordance with a preferred embodiment of the present invention.

A preferred implementation of the selection 124 and rendering 126 of image parcels in accordance with the present invention is detailed in FIGS. 8 through 10. Referring first to FIG. 8, any outstanding requests in the priority request queue 52 are preferably cleared 142 in response to a change in the viewing frustum location and orientation. The effective altitude of the viewing frustum and or the resolution of the client display are then used as a basis for determining an optimal level of detail L that will be displayed. The detail level L value operates as a floor defining the maximum resolution $K_L$ of image data that can be effectively viewed on the client display given the location and or orientation of the viewing frustum. Constraining image parcel requests to the resolution range $K_N$ to $K_L$, where $K_N$ is the lowest resolution derivative image stored by the network server 12, 22, prevents the download and processing of image parcels that cannot provide any perceptible improvement in the displayed image.

As part of the recursive evaluation of the optimal level of detail L, the image display space is progressively split 146 by four to one reductions into polygons. The quad-tree data structures holding existing image parcel data in the parcel data store 46 are concurrently traced 148 to establish a correspondence with the polygon map. Where the trace of a quad-tree data structure completes 150 to a node index of L for a polygon P, the node corresponding image parcel is associated with polygon P. The polygon P will not be further subdivided and no higher resolution image parcels will be requested for any portion of the image within the area represented by polygon P. Where the trace reaches a maximum node index of D for a polygon P' 152, where $N \leq D < L$ and N is the index of the lowest resolution derivative image stored by the network server 12, 22, the image parcel associated with the node is associated with the polygon P'. This polygon P' will be subject to further subdivision and progressive requests for image parcels of higher resolution up to the detail level L.

Referring now to FIG. 9, a display image is then rendered 160 beginning with the maximum depth polygons previously found. Iterating over the set of maximum depth polygons, any polygons outside of the viewing frustum are skipped 162. Polygons that are at least partially visible are clipped to the applicable bounds of the viewing frustum 164. The polygon corresponding image parcel data is then texture mapped 166 into the polygon corresponding coordinates of the video memory 70. If the node index depth of the rendered image parcel is at least equal to the prior determined optimal detail level L 168, the iteration over the polygons P continues.

Where the node index depth is less than the optimal detail level L 170, the polygon P' is subdivided into four polygons and correspondingly represented by the creation of four child nodes within the associated quad-tree data structure 172. Four image parcel download requests are then created 174.

The download priority associated with each request is determined 176 by execution of a function S that operates on a 2D polygon argument P and returns a real number representing the request priority. The function argument P is a list of real (x, y) coordinates of the vertices of the current polygon in screen coordinates after being clipped to fit within the current viewing frustum. That is, the function S works over general polygons in a two-dimensional space, whose vertices are specified by the series $\{(x(1),y(1)),(x(2),y(2)), \ldots ,(x(n),y(n))\}$. The argument P vertices sent to S represent the position of the vertices composing each of the polygons, after being clipping to the viewing frustum, viewable within the display space having the fixed resolution [xRes, yRes]. Thus, the clipped polygons are all within the rectangle [O, xRes]× [O, yRes].

In execution of the function S, each of the P coordinates is first transformed by linear mapping of the screen coordinate space to the square $[-1,1] \times [-1,1]$ by the operation $x(i):=(x(i)-xRes/2)/(xRes/2)$; $y(i)$, $(y(i)-yRes/2)/(yRes/2)$. The x and y coordinate values of each vertex $(x(i),y(i))$ for $i=1$ to $n$) are then transformed by the function $T(a)=sgn(a)*pow(|a|, d)$, where the control parameter d is a constant in the range $(0,1]$, or equivalently the interval $0<d\leq 1$. The function S then returns a real value that is equal to the area covered by the argument polygon P vertices subject to the applied coordinate transformation. Thus, the accumulated priority for any image parcel pending download is the sum of the values of returned by the function S for each of the viewable polygons that require some part of the image parcel as the source data for texture map rendering of the polygon. The priority operation of the request queue 52 is such that download requests will be issued preferentially for image parcels with the largest priority value.

In accordance with the preferred embodiments of the present invention, the value of the control parameter d can be adjusted to ultimately affect the behavior of the function S in determining the download request priority. In general, image parcels with lower resolution levels will accumulate greater priority values due to the larger number of polygons that may use a given low resolution image parcel as a rendering data source. Such lower resolution image parcels are therefore more likely to be preferentially downloaded. In accordance with the present invention, this generally assures that a complete image of at least low resolution will be available for rendering.

The control parameter d, as applied in execution of the function S, well as the area distortion produced by the projection transform also influences the value returned by the function S such that relatively higher-resolution image parcels near the image view point will occasionally achieve a higher priority than relatively remote and partially viewed image parcels of lower resolution. Using values smaller than 1 for the control parameter d results in requests with a higher priority for parcels covering areas near the focal point of the viewer, which is presumed to be the center point of the display space, relative to requests for parcels further from the center point in absolute terms and of the same resolution depth D. Thus, in accordance with the present invention, the priority assigned to image parcel requests effectively influences the order of requests based on the relative contribution of the image parcel data to the total display quality of the image. Empirically, a value of 0.35 for the control parameter d for small screen devices, such as PDAs and webphones has been found to produce desirable results.

The computed priorities of each of the four newly created image parcel requests are then assigned 178 and the requests are enqueued in the priority request queue 52. The next polygon P is then considered in the loop of the image parcel rendering process 160.

The preferred algorithm 180 for determining the detail level L value for a given viewing frustum is shown in FIG. 10. In accordance with the present invention, the optimal detail level L is effectively the limit at which the resolution of image parcel data functionally exceeds the resolution of the client display. Preferably, to determine the optimal detail level L, the viewpoint or camera position of the viewing frustum is determined 182 relative to the displayed image. A nearest polygon P of depth D is then determined 184 from the effective altitude and attitude of the viewpoint. The nearest point A of the polygon P is then determined 186. The point A may be within the interior or an edge of the polygon P, though most likely be located at a vertex of the polygon P.

The optimum level of detail L at point A is then computed 188 as the base-4 logarithm of the number of pixels on the screen that would be covered by a single pixel from an image parcel of the lowest resolution $K_{-N}$ image, which is the quad-tree root image and corresponds to an image area covering the entire image map. The point A optimal detail level L is preferably computed analytically from the local value of the Jacobian of the projective transform used to transform the three dimensional image coordinate space to screen coordinates, evaluated at the point A.

Where the depth D of the polygon P is greater than the depth of the computed optimal level of detail L, the detail level L is taken as the optimal detail level L 190. Thus, through the process 140, an image parcel or corresponding section of the closest resolution image parcel associated with a parent node in the quad-tree data structure relative to the depth level L will be used as the texture for rendering the polygon P. Conversely, if the depth D is less than that of the optimal detail level L, the polygon P is effectively split into quadrants and the optimal level of detail is reevaluated. The process 180 thus continues iteratively until the optimal detail level L is found.

Thus, a system and methods of optimally presenting image data on client systems with potentially limited processing performance, resources, and communications bandwidth have been described. While the present invention has been described particularly with reference to the communications and display of geographic image data, the present invention is equally applicable to the efficient communications and display of other high resolution information.

In the process implemented by the system described above, data parcels may be selected for sequential transmission based on a prioritization of the importance of the data contained. The criteria for the importance of a particular data parcel may be defined as suitable for particular applications and may directly relate to the presentation of image quality, provision of a textual overlay of a low-quality image to quickly provide a navigational orientation, or the addition of topography information at a rate or timing different from the rate of image quality improvement. Thus, image data layers reflecting navigational cues, text overlays, and topography can be composed into data packets for transmission subject to prioritizations set by the server alone and not based on the client system and interactively influenced by the actions and commands provided by the user of the client system. However, this also may be influenced based on the nature and type of the client system, and interactively influenced by the actions and commands provided by the user of the client system (FIG. 5).

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method of communicating images for display to a plurality of wireless portable devices, the method comprising steps of:
   pre-processing a source image to obtain a series ($K_0$, $K_{-1}$ ... $K_{1-N}$) of related images of progressively lower image resolution, wherein each related image of the series ($K_0$, $K_{-1}$ ... $K_{1-N}$) comprises pixel data and is subdivided into a regular array of image parcels, and each image parcel of each regular array of the image parcels forms a discrete portion of the source image;

storing the image parcels of the series for serving by one or more servers;
providing client software to a wireless portable device;
receiving a first request at the one or more servers from the first wireless portable device over a network communication channel, wherein the network communication channel is at least in part wireless, and the first request being for a first image parcel of the series, wherein the first image parcel is selected based on a first user-controlled image viewpoint on the first wireless portable device relative to the source image;
sending the first image parcel from the one or more servers to the first wireless portable device over the network communication channel, in response to the first request;
receiving a second request at the one or more servers from the first wireless portable device over the network communication channel, the second request being for a second image parcel of the series, wherein the second image parcel is selected based on the first user-controlled image viewpoint on the first wireless portable device relative to the source image, the step of receiving the second request being performed after the step of receiving the first request; and
sending the second image parcel from the one or more servers to the first wireless portable device over the network communication channel, in response to the second request;
wherein:
the first wireless portable device renders at least a portion of the first image parcel before finishing receiving the second image parcel;
the first wireless portable device issues the first request and the second request according to a priority order;
priority of the second request in the priority order is not higher than priority of the first request in the priority order;
the first wireless portable device stores the first image parcel and the second image parcel in a local parcel storage at the first wireless portable device;
before issuing the first request, the first wireless portable device determines that a third image parcel is usable for the first user-controlled image viewpoint and the third image parcel is already stored in the local parcel storage, and the first wireless portable device renders the third image parcel before issuing the first request without requesting the third image parcel over the network communication channel;
the first wireless portable device handles download operations of at least the first image parcel and the second image parcel in parallel, thereby enabling efficient use of network bandwidth in conditions of network latency; and
the local parcel store is configured as a server to provide access to the at least some image parcels received by the first wireless portable device.

2. The method of claim 1, wherein the first user-controlled image viewpoint is determined based on a navigational input of the first wireless portable device.

3. The method of claim 2 wherein the navigational input comprises three-dimensional positional coordinate data and rotational positional data.

4. The method of claim 2, wherein the first wireless portable device stores requests for image parcels to be downloaded from the one or more servers in a priority queue, and wherein responsive to a change in the navigational input, a request is removed from the priority queue.

5. The method of claim 1, wherein number of parallel image parcel download operations by the first wireless portable device for image parcels of the series is determined based at least in part on network response latency and available system resources.

6. The method of claim 1, further comprising sending overlay data by the one or more servers to the first wireless portable device over the network communication channel.

7. The method according to claim 6, wherein the overlay data comprises text annotations relating to at least one item selected from the group consisting of: one or more street names, one or more building names, and one or more landmarks.

8. The method of claim 1, wherein the wireless portable device issues the first request and the second request according to a priority order based at least in part on viewable areas corresponding to the first user-controlled image viewpoint.

9. The method of claim 1, wherein the first wireless portable device issues the first request and the second request according to a priority order based at least in part on resolution of the first image parcel and resolution of the second image parcel.

10. A computing system comprising one or more servers, wherein the one or more servers are coupled to a wireless portable device by a network communication channel, the network communication channel being at least in part wireless, the one or more servers being configured to:
pre-process a source image to obtain a series ($K_0$, $K_{-1} \ldots K_{1-N}$) of related images of progressively lower image resolution, wherein each related image of the series ($K_0$, $K_{-1} \ldots K_{1-N}$) comprises pixel data and is subdivided into a regular array of image parcels, and each image parcel of each regular array of the image parcels forms a discrete portion of the source image;
store the image parcels of the series for serving by the one or more servers;
provide client software to the wireless portable device;
receive a first request from the wireless portable device over the network communication channel, the first request being for a first image parcel of the series, wherein the first image parcel is selected based on a first user-controlled image viewpoint on the wireless portable device relative to the source image;
send the first image parcel from the one or more servers to the wireless portable device over the network communication channel, in response to the first request;
receive a second request from the wireless portable device over the network communication channel, the second request being for a second image parcel of the series, wherein the second image parcel is selected based on the first user-controlled image viewpoint on the wireless portable device relative to the source image, the second request being received by the one or more servers after the first request is received by the one or more servers; and
send the second image parcel from the one or more servers to the wireless portable device over the network communication channel, in response to the second request;
wherein:
the wireless portable device renders at least a portion of the first image parcel before finishing receiving the second image parcel;
the wireless portable device issues the first request and the second request according to a priority order;

priority of the second request in the priority order is not higher than priority of the first request in the priority order;

the wireless portable device stores the first image parcel and the second image parcel in a local parcel storage at the first wireless portable device;

before issuing the first request, the first wireless portable device determines that a third image parcel is usable for the first user-controlled image viewpoint and that the third image parcel is already stored in the local parcel storage, and the wireless portable device renders the third image parcel before issuing the first request without requesting the third image parcel over the network communication channel;

the wireless portable device handles download operations of at least the first image parcel and the second image parcel in parallel, thereby enabling efficient use of network bandwidth in conditions of network latency; and the local parcel store is configured as a server to provide access to the at least some image parcels received by the wireless portable device.

11. The computing system of claim 10, wherein the first user-controlled image viewpoint is determined based on a navigational input of the wireless portable device.

12. The computing system of claim 11, wherein the navigational input comprises three-dimensional positional coordinate data and rotational positional data.

13. The computing system of claim 11, wherein the wireless portable device stores requests for the image parcels of the series to be downloaded from the one or more servers in a priority queue, and wherein responsive to a change in the navigational input, a request is removed from the priority queue.

14. The computing system of claim 10, wherein number of parallel image parcel download operations by the wireless portable device for the image parcels of the series is determined based at least in part on network response latency and available system resources.

15. The computing system of claim 10, wherein the one or more servers are further configured to send overlay data to the wireless portable device over the network communication channel.

16. The computing system of claim 15, wherein the overlay data comprises text annotations relating to at least one item selected from the group consisting of: one or more street names, one or more building names, and one or more landmarks.

17. The computing system of claim 10, wherein the wireless portable device issues the first request and the second request according to a priority order based at least in part on viewable areas corresponding to the first user-controlled image viewpoint.

18. The computing system of claim 10, wherein the wireless portable device issues the first request and the second request according to a priority order based at least in part on resolution of the first image parcel and resolution of the second image parcel.

19. A wireless portable device, wherein:

the wireless portable device is coupled to one or more servers over a network communication channel, the network communication channel being at least in part wireless, the one or more servers storing a series ($K_0$, $K_{-1}$ ... $K_{1-N}$) of related images of progressively lower image resolution, each related image of the series ($K_0$, $K_{-1}$ ... $K_{1-N}$) comprising pixel data and being subdivided into a regular array of image parcels, each image parcel of each regular array of the image parcels of the series forming a discrete portion of a source image, the series being obtained by processing the source image, the one or more servers being configured to serve the related images of the series;

the wireless portable device is configured to:

determine a first image parcel of the series based on a first user-controlled image viewpoint on the wireless portable device relative to the source image;

send a first request for the first image parcel of the series to the one or more servers over the network communication channel;

receive the first image parcel from the one or more servers over the network communication channel, in response to the first request;

determine a second image parcel based on the first user-controlled image viewpoint on the wireless portable device relative to the source image;

send a second request for the second image parcel to the one or more servers, the second request being sent after the first request; and receive the second image parcel from the one or more servers to the wireless portable device over the network communication channel, in response to the second request;

render at least a portion of the first image parcel before finishing receiving the second image parcel;

store the first image parcel and the second image parcel in a local parcel storage at the first wireless portable device;

before sending the first request, determine that a third image parcel is usable for the first user-controlled image viewpoint and the third image parcel is already stored in the local parcel storage, and render the third image parcel without requesting the third image parcel over the network communication channel;

handle download operations of at least the first image parcel and the second image parcel in parallel, thereby enabling efficient use of network bandwidth in conditions of network latency;

configure the local parcel store as a server to provide access to at least some image parcels received by the wireless portable device;

the first request and the second request are issued according to a priority order;

priority of the second request in the priority order is not higher than priority of the first request in the priority order.

20. The wireless portable device of claim 19, further configured to determine the first user-controlled image viewpoint based on a navigational input of the wireless portable device.

21. The wireless portable device of claim 20, wherein the navigational input comprises three-dimensional positional coordinate data and rotational positional data.

22. The wireless portable device of claim 20, further configured to store requests for image parcels to be downloaded from the one or more servers in a priority queue, and, responsive to a change in the navigational input, to remove a request from the priority queue.

23. The wireless portable device of claim 19, wherein number of parallel image parcel download operations by the wireless portable device for image parcels of the series is determined based at least in part on network response latency and available system resources.

24. The wireless portable device of claim 19, further configured to receive overlay data sent by the one or more servers to the wireless portable device over the network communication channel, and to render the overlay data when rendering parcel images of the series.

25. The wireless portable device of claim 24, wherein the overlay data comprises text annotations relating to at least one item selected from the group consisting of: one or more street names, one or more building names, and one or more landmarks.

26. The wireless portable device of claim 19, further configured to send the first request and the second request according to a priority order based at least in part on viewable areas corresponding to the first user-controlled image viewpoint.

27. The wireless portable device of claim 19, further configured to send the first request and the second request according to a priority order based at least in part on resolution of the first image parcel and resolution of the second image parcel.

\* \* \* \* \*

UNITED STATES PATENT AND TRADEMARK OFFICE
CERTIFICATE OF CORRECTION

| | | |
|---|---|---|
| PATENT NO. | : 9,635,136 B2 | |
| APPLICATION NO. | : 15/343052 | |
| DATED | : April 25, 2017 | |
| INVENTOR(S) | : Isaac Levanon et al. | |

It is certified that error appears in the above-identified patent and that said Letters Patent is hereby corrected as shown below:

In the Claims

Column 13, Line 3, cancel "a wireless" and replace the cancelled text with --a first wireless--;

Column 13, Line 54, cancel "parcel store" and replace the cancelled text with --parcel storage--;

Column 14, Line 14, cancel "the wireless" and replace the cancelled text with --the first wireless--;

Column 15, Line 20, cancel "parcel store" and replace the cancelled text with --parcel storage--;

Column 16, Line 41, cancel "parcel store" and replace the cancelled text with --parcel storage--.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*